United States Patent
Liao

(10) Patent No.: US 8,122,173 B2
(45) Date of Patent: Feb. 21, 2012

(54) SERIAL PERIPHERAL INTERFACE (SPI) CIRCUIT HAVING DRIVING CIRCUIT WITH DATA INPUT AND OUTPUT COMMON PIN AND DISPLAY USING THE SAME

(75) Inventor: Chien-Chuan Liao, Taipei County (TW)

(73) Assignee: Novatek Microelectronics Corp., Hsinchu (TW)

( * ) Notice: Subject to any disclaimer, the term of this patent is extended or adjusted under 35 U.S.C. 154(b) by 668 days.

(21) Appl. No.: 12/275,180

(22) Filed: Nov. 20, 2008

(65) Prior Publication Data

US 2009/0267672 A1 Oct. 29, 2009

(30) Foreign Application Priority Data

Apr. 25, 2008 (TW) .............................. 97115370 A

(51) Int. Cl.
*G06F 13/40* (2006.01)
(52) U.S. Cl. ............ 710/110; 710/306; 710/11; 710/60
(58) Field of Classification Search .......... 710/300–315, 710/8–19, 72, 60–64, 104–119
See application file for complete search history.

(56) References Cited

U.S. PATENT DOCUMENTS

| | | | | |
|---|---|---|---|---|
| 5,991,194 A * | 11/1999 | Jigour et al. | ............ | 365/185.04 |
| 6,687,769 B2 * | 2/2004 | Cheung | ............ | 710/52 |
| 7,028,105 B2 * | 4/2006 | Dute et al. | ............ | 710/1 |
| 7,558,900 B2 * | 7/2009 | Jigour et al. | ............ | 710/305 |
| 2004/0139369 A1 * | 7/2004 | Kirschner | ............ | 714/25 |
| 2007/0136502 A1 * | 6/2007 | Wen et al. | ............ | 710/110 |
| 2009/0138626 A1 * | 5/2009 | Le et al. | ............ | 710/23 |
| 2009/0222251 A1 * | 9/2009 | Gloekler et al. | ............ | 703/14 |

FOREIGN PATENT DOCUMENTS

| | | |
|---|---|---|
| TW | 200604822 | 2/2006 |
| TW | 200725284 | 7/2007 |

OTHER PUBLICATIONS

"Office Action of Taiwan Counterpart Application", issued on Nov. 15, 2011, p. 1-p. 10, in which the listed references were cited.

* cited by examiner

*Primary Examiner* — Raymond Phan
(74) *Attorney, Agent, or Firm* — Jianq Chyun IP Office

(57) ABSTRACT

A serial peripheral interface (SPI) circuit and a display using the same are provided. The SPI circuit includes a mater device and a slave device. A serial data input pin and a serial data output pin of the slave device are both electrically connected to a data input/output pin of the master device. When a read instruction is sent from the master device to the slave device, the master device is set in a read status, and the slave device outputs data to the master device via the serial data output pin in response to the read instruction. When a write instruction is sent from the master device to the slave device, the master device is set in a write status, and writes data to the slave device via the serial data input pin thereof in response to the write instruction.

19 Claims, 11 Drawing Sheets

SERIAL PERIPHERAL INTERFACE (SPI) CIRCUIT HAVING DRIVING CIRCUIT WITH DATA INPUT AND OUTPUT COMMON PIN AND DISPLAY USING THE SAME

CROSS-REFERENCE TO RELATED APPLICATION

This application claims the priority benefit of Taiwan application serial no. 97115370, filed on Apr. 25, 2008. The entirety of the above-mentioned patent application is hereby incorporated by reference herein and made a part of this specification.

BACKGROUND OF THE INVENTION

1. Field of the Invention

The present invention relates to a serial peripheral interface (SPI) circuit and a display using the same.

2. Description of Related Art

In recent years, as a liquid crystal display has been more and more widely applied, it has been used as a display equipment for numerous consumer electronic products such as cell phones and computer screens. Generally, a liquid crystal display includes a liquid crystal display (LCD) panel, an LCD panel driving circuit and a storage device for storing initialization data of the LCD panel. The data transmission between the driving circuit and the storage device is mainly achieved through a serial peripheral interface (briefly referred to as SPI below), which allows the serial data exchange between the driving circuit (master device) and the storage device (slave device).

Generally, the above SPI is mainly classified as a three-port SPI and a four-port SPI.

FIG. 1 is a structural schematic diagram of a conventional four-port SPI circuit for a liquid crystal display. The four-port SPI circuit 100 includes an LCD panel driving circuit 110 and a serial storage device 120 (for example, serial flash memory). The LCD panel driving circuit 110 includes a main control unit (MCU) 130. The MCU 130 and the serial storage device 120 respectively include chip enable pins 131 and 121 for transmitting chip enable signals CE (Chip Enable), serial clock pins 132 and 122 for transmitting serial clock signals SCK, serial data input pins 133 and 123 for inputting data signals SI (Serial Data In, SI shown in the figure), and serial data output pins 134 and 124 for outputting data signals SO (Serial Data Out, SO shown in the figure). However, the MCU 130 is the master device of the four-port SPI circuit 100, and the serial storage device 120 is the slave device of the four-port SPI circuit 100.

FIG. 2 is a timing control diagram of the four-port SPI circuit 100 shown in FIG. 1 in a master read cycle. Referring to FIG. 2, before the data transmission starts, the chip enable pin 131 of the MCU 130 outputs a chip enable signal CE at a low potential (the inverted chip enable signal CE# as shown in the figure is at a high potential) to the chip enable pin 121 of the serial storage device 120, so that the serial data output pin 124 of the serial storage device 120 is set in a high impedance state. When the data transmission starts, the chip enable pin 131 of the MCU 130 outputs a chip enable signal CE at a high potential (the inverted chip enable signal CE# as shown in the figure is at a low potential) to the chip enable pin 121 of the serial storage device 120, for informing the serial storage device 120 that the communication starts.

Then, the MCU 130 outputs eight clocks 0-7 to the serial clock pin 122 of the serial storage device 120 via the serial clock pin 132, and transfers a read instruction to the serial data input pin 123 of the serial storage device 120 in the eight clocks via the serial data input pin 133, so as to inform the serial storage device 120 that this is a data read cycle. At the point of the eighth clock falling edge, the serial storage device 120 sets the serial data output pin 124 thereof in a normal output status, and then outputs data to the MCU 130 via the serial data output pin 124 according to the received clocks. When the data transmission is finished, the chip enable pin 131 of the MCU 130 re-outputs a chip enable signal CE at a low potential (the inverted chip enable signal CE# as shown in the figure is at a high potential) to the chip enable pin 121 of the serial storage device 120, so that the serial data output pin 124 of the serial storage device 120 is set in a high impedance state.

FIG. 3 is a timing control diagram of the four-port SPI circuit 100 shown in FIG. 1 in a master write cycle. Referring to FIG. 3, when the data transmission starts, the chip enable pin 131 of the MCU 130 outputs a chip enable signal CE at a high potential (the inverted chip enable signal CE# as shown in the figure is at a low potential) to the chip enable pin 121 of the serial storage device 120, for informing the serial storage device 120 to start transmission. Then, the MCU 130 outputs eight clocks 0-7 to the serial clock pin 122 of the serial storage device 120 via the serial clock pin 132 thereof, and then transfers a write instruction to the serial data input pin 123 of the serial storage device 120 in the eight clocks via the serial data input pin 133, so as to inform the serial storage device 120 that the communication this time is a data write cycle.

At the point of the eighth clock falling edge, the MCU 130 outputs data to the serial storage device 120 according to the clock SCK via the serial data output pin 134 thereof. When the data transmission is finished, the chip enable pin 131 of the MCU 130 re-outputs a chip enable signal CE at a low potential (the inverted chip enable signal CE# as shown in the figure is at a high potential) to the chip enable pin 121 of the serial storage device 120. In the data write cycle, the serial data output pin 124 of the serial storage device 120 always maintains a high impedance state.

FIG. 4 is a structural schematic diagram of a conventional three-port SPI circuit for a liquid crystal display. The three-port SPI circuit 200 includes an LCD panel driving circuit 210 and a serial storage device 220. The LCD panel driving circuit 210 includes a main control unit (MCU) 230. The MCU 230 and serial storage device 220 respectively include chip enable pins 231 and 221 for transmitting chip enable signals, serial clock pins 232 and 222 for transmitting serial clock signals SCK, and data input/output pins 233 and 223 for inputting/outputting data signals SI/SO (Serial data in/out) respectively. The MCU 230 is a master device of the three-port SPI circuit 200, and the serial storage device 220 is a slave device of the three-port SPI circuit 200.

FIG. 5 is a timing control diagram of the three-port SPI circuit 200 shown in FIG. 4 in a master read cycle. Referring to FIG. 5, when the data transmission starts, the chip enable pin 231 of the MCU 230 outputs a chip enable signal CE at a high potential (the inverted chip enable signal CE# as shown in the figure is at a low potential) to the chip enable pin 221 of the serial storage device 220, for informing the serial storage device 220 to start transmission. Then, the MCU 230 outputs eight clocks 0-7 to the serial clock pin 222 of the serial storage device 220 via the serial clock pin 232, and then transfers a read instruction to the data input/output pin 223 of the serial storage device 220 in the eight clocks via the data input/output pin 233, for informing the serial storage device 220 that the communication this time is a data read cycle. At the point of the eighth clock falling edge, the serial storage device 220 outputs data to the MCU 230 according to the received clocks via the data input/output pin 223. When the data transmission is finished, the chip enable pin 231 of the MCU 230 re-outputs a chip enable signal CE at a low potential (the inverted chip enable signal CE# as shown in the figure is at a high potential) to the chip enable pin 221 of the serial storage device 220, and then the data input/output pin 223 of the serial storage device 220 returns to maintain a high impedance state.

FIG. 6 is a timing control diagram of the three-port SPI circuit 200 shown in FIG. 4 in a master write cycle. Referring to FIG. 6, when the data transmission starts, the chip enable pin 231 of the MCU 230 outputs a chip enable signal CE at a high potential (the inverted chip enable signal CE# as shown in the figure is at a low potential) to the chip enable pin 221 of the serial storage device 220, for informing the serial storage device 220 to start transmission. Then, the MCU 230 outputs eight clocks 0-7 to the serial clock pin 222 of the serial storage device 220 via the serial clock pin 232, and then transfers a write instruction to the data input/output pin 223 of the serial storage device 220 via the data input/output pin 233, so as to inform the serial storage device 220 that the communication this time is a data write cycle. At the point of the eighth clock falling edge, the MCU 230 outputs data to the serial storage device 220 according to the clocks via the data input/output pin 233. When the data transmission is finished, the chip enable pin 231 of the MCU 230 re-outputs a chip enable signal CE at a low potential (the inverted chip enable signal CE# as shown in the figure is at a high potential) to the chip enable pin 221 of the serial storage device 220. Then, the data input/output pin 233 returns to maintain a high impedance state.

As the liquid crystal displays in the prior art have the above two incompatible SPI circuits 100 and 200, the storage devices having the three-port SPI cannot be used interchangeably with those having the four-port SPI, which causes difficulties for reducing the design and manufacture costs of the liquid crystal display.

SUMMARY OF THE INVENTION

Accordingly, the present invention is directed to a serial peripheral interface (SPI) circuit and a display device with a better compatibility, in which a single output port is simultaneously used as a data input/output interface connecting port for a serial peripheral interface, which is compatible with the specification of the serial peripheral interface (briefly referred to as SPI hereinafter).

An SPI circuit provided in the present invention includes a master device and a slave device. The master device includes a first chip enable pin, a first serial clock pin, and a data input/output pin. The slave device includes: a second chip enable pin, electrically connected to the first chip enable pin of the master device; a second serial clock pin, electrically connected to the first serial clock pin of the master device; and a serial data input pin and a serial data output pin, both electrically connected to the data input/output pin of the master device. When a read instruction is transferred from the master device to the slave device, the master device is set in a read status and the slave device outputs data to the master device via the serial data output pin in response to the read instruction. When a write instruction is transferred from the master device to the slave device, the master device is set in a write status and the master device transfers data to the slave device for storing therein via the serial data input pin in response to the write instruction.

In the above SPI circuit, the slave device is a serial storage device, and in an embodiment, the slave device is a serial flash memory device.

In the above SPI circuit, the master device has a three-port SPI, and the slave device has a four-port SPI.

In the above SPI circuit, the slave device includes a plurality of buffer registers therein. The plurality of buffer registers at least includes a first buffer register for unidirectionally receiving and registering data transferred via the serial data input pin, and a second buffer register for unidirectionally registering and outputting data to be outputted from the serial data output pin.

In the above SPI circuit, the master device includes a plurality of buffer registers. The plurality of buffer registers at least includes a first buffer register and a second buffer register, which are both electrically connected to the data input/output pin. In an embodiment, when the master device is set in a read status, the first buffer register unidirectionally receives and registers data transmitted from the slave device via the data input/output pin, and the second buffer register is in a disenabled status. In another embodiment, when the master device is set in a write status, the second buffer register unidirectionally transfers data to the slave device via the data input/output pin.

A display device provided in the present invention includes a display panel, a driving circuit and a serial storage device. The driving circuit is coupled to the display panel, for receiving a display data signal and transferring the display data signal to the display panel. The driving circuit includes a first SPI and a serial storage device. The first SPI includes a first chip enable pin, a first serial clock pin and a data input/output pin. The serial storage device has a second SPI. The second SPI includes: a second chip enable pin, electrically connected to the first chip enable pin; a second serial clock pin, electrically connected to the first serial clock pin; a serial data input pin, electrically connected to the data input/output pin; and a serial data output pin, electrically connected to the data input/output pin. When a read instruction is transferred from the driving circuit to the serial storage device, the driving circuit is set in a read status and the serial storage device outputs data to the driving circuit via the serial data output pin in response to the read instruction. When a write instruction is transferred from the driving circuit to the serial storage device, the driving circuit is set in a write status and the driving circuit transfers data to the serial storage device for storing therein via the serial data input pin in response to the write instruction.

The driving circuit is used to receive a display data signal and transfers it to the display panel. The driving circuit has an SPI with a three-port signal transmission pin, in which the three-port signal transmission pin includes a first chip enable pin, a first serial clock pin and a data input/output pin. The serial storage device has an SPI with a four-port signal transmission pin, in which the four-port signal transmission pin includes a second chip enable pin, a second serial clock pin, a serial data input pin and a serial data output pin. The driving circuit is connected with the serial storage device, and particularly, the first chip enable pin is electrically connected with the second chip enable pin, the first serial clock pin is electrically connected with the second serial clock pin, and the input/output pin is simultaneously electrically connected with the serial data input pin and the serial data output pin.

When a read instruction is transferred from the driving circuit to the serial storage device, the driving circuit is set in a read status, and the serial storage device outputs data to the driving circuit via the serial data output pin in response to the read instruction. When a write instruction is transferred from the driving circuit to the serial storage device, the driving circuit is set in a write status, and the driving circuit transfers data to the serial storage device for storing therein via the serial data input pin in response to the write instruction.

In the SPI circuit, in an embodiment, the serial storage device is a serial flash memory device.

In the above display device, the serial storage device includes a plurality of buffer registers therein. The plurality of buffer registers at least includes a buffer register for unidirectionally receiving and registering data transferred via the serial data input pin, and another buffer register for unidirectionally registering and outputting data to be outputted from the serial data output pin.

In the above display device, the driving circuit includes a plurality of buffer registers. The plurality of buffer registers at least includes a first buffer register and a second buffer register, which are both electrically connected to the data input/output pin. In an embodiment, when the first SPI is set in a read status, the first buffer register unidirectionally receives and registers data transmitted from the second SPI via the data input/output pin, and the second buffer register is in a disenabled status. In another embodiment, when the first SPI is set in a write status, the second buffer register unidirectionally transfers data to the second SPI via the data input/output pin.

In the SPI circuit, the second SPI includes a plurality of buffer registers therein. The plurality of buffer registers at least includes a first buffer register for unidirectionally receiving and registering data transferred via the serial data input pin, and a second buffer register for unidirectionally registering and outputting data to be outputted from the serial data output pin.

The SPI circuit provided in the present invention enables a liquid crystal display (LCD) panel driving circuit with a three-port SPI to read a serial storage device with a four-port SPI, and thus the SPI circuit has a better compatibility.

In order to make the foregoing and other objects, features, and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
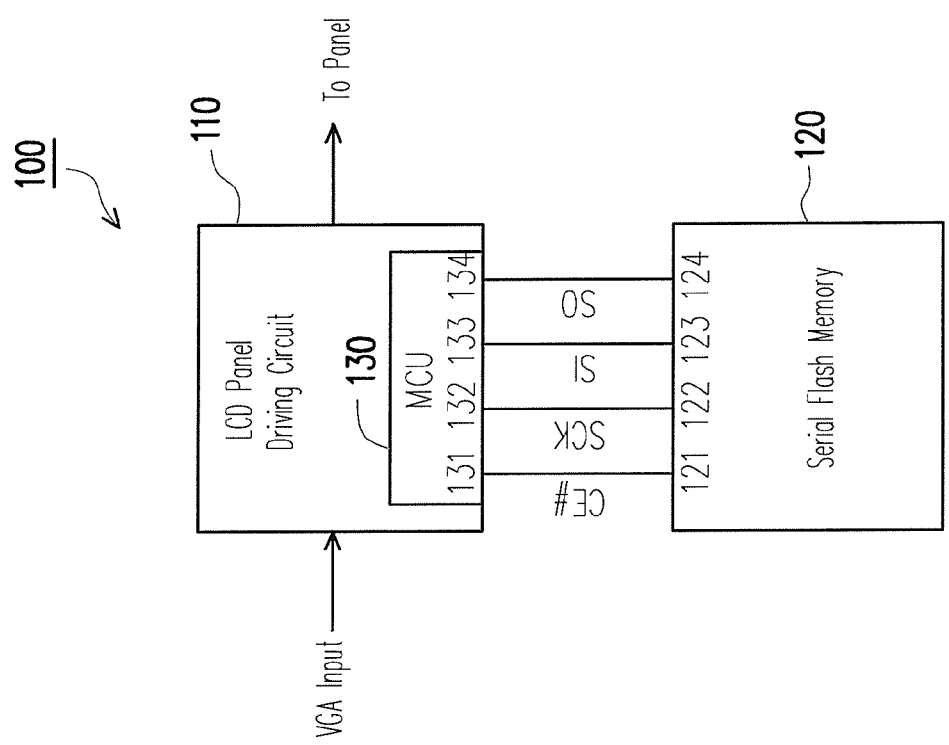
FIG. 1 is a structural schematic diagram of a conventional four-port SPI circuit for a liquid crystal display.
Figure 2:
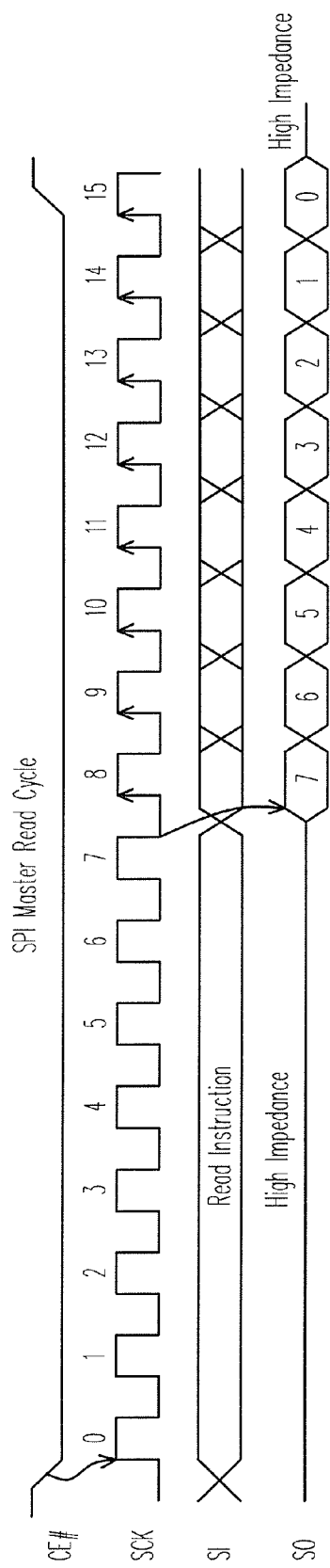
FIG. 2 is a timing control diagram of a data reading motion for the four-port SPI circuit shown in FIG. 1.
Figure 3:
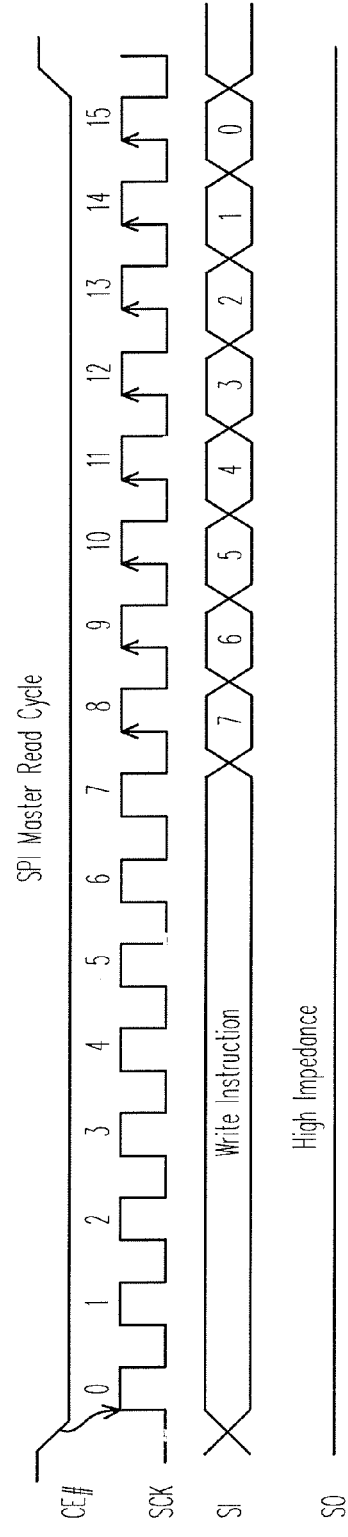
FIG. 3 is a timing control diagram of a data writing motion for the four-port SPI circuit shown in FIG. 1.
Figure 4:
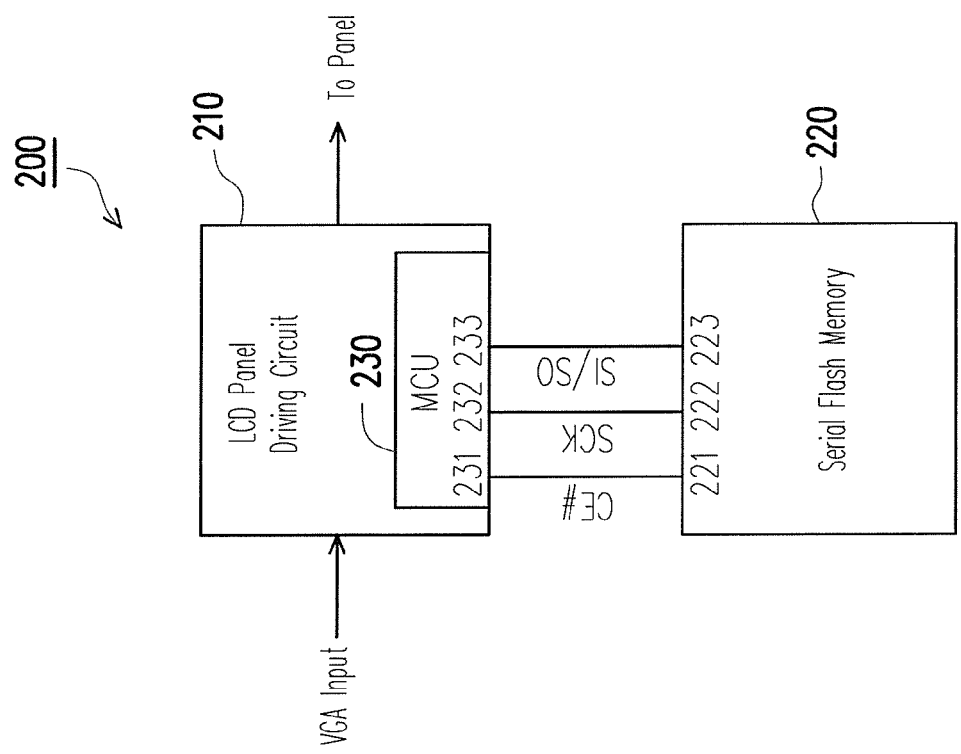
FIG. 4 is a structural schematic diagram of a conventional three-port SPI circuit for a liquid crystal display.
Figure 5:
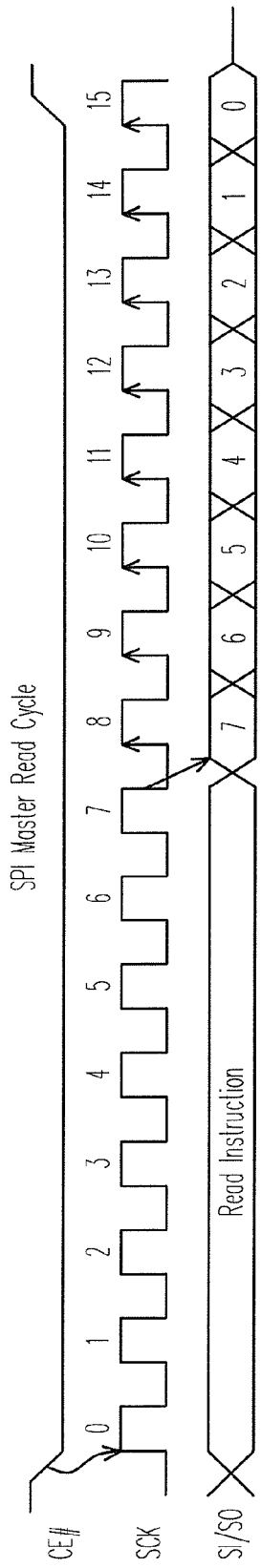
FIG. 5 is a timing control diagram of a data reading motion for the three-port SPI circuit shown in FIG. 4.
Figure 6:
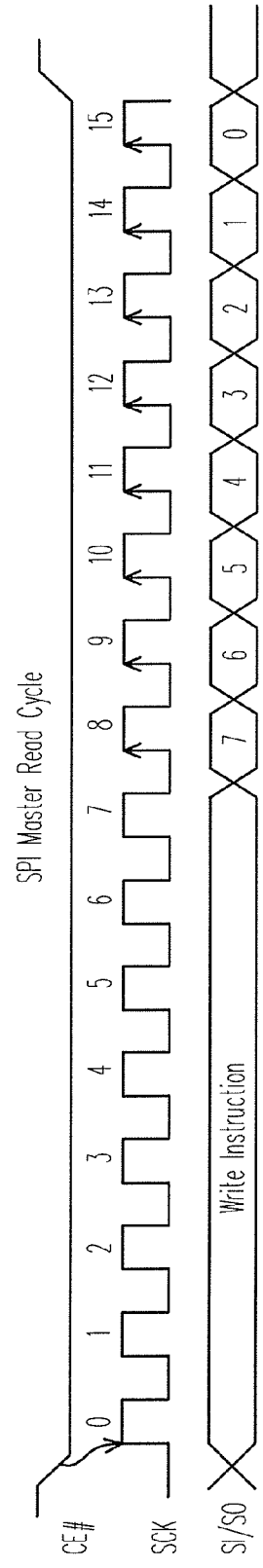
FIG. 6 is a timing control diagram of a data writing motion for the three-port SPI circuit shown in FIG. 4.

Reference will now be made in detail to the present preferred embodiments of the invention, examples of which are illustrated in the accompanying drawings. Wherever possible, the same reference numbers are used in the drawings and the description to refer to the same or like parts.

Figure 7:
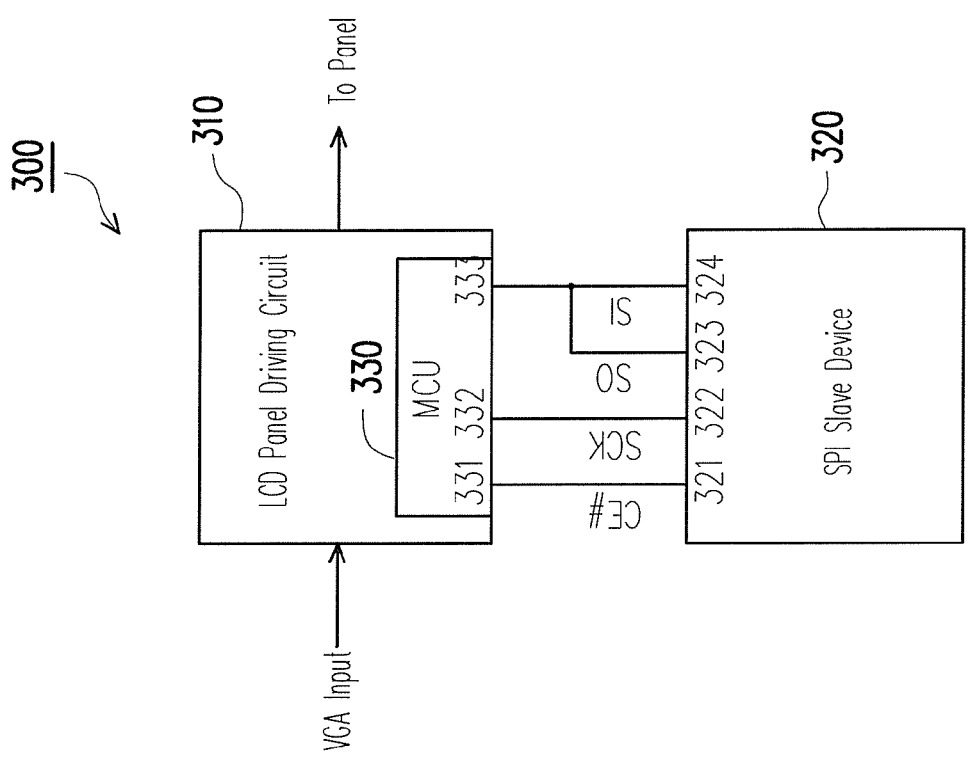
FIG. 7 is a structural schematic diagram of an SPI circuit according to an embodiment of the present invention.

FIG. 7 is a structural schematic diagram of an SPI circuit according to an embodiment of the present invention. The SPI circuit 300 includes a driving circuit 310 and a serial storage device 320. The driving circuit 310 is illustrated by taking an LCD panel as an example, but is not limited herein. The serial storage device 320 is illustrated by taking a serial flash memory as an example.

The driving circuit 310 includes a main control unit (MCU) 330. The MCU 330 is a master device with a three-port SPI, which includes a chip enable pin 331 for transmitting a chip enable signal CE, a serial clock pin 332 for transmitting a serial clock signal SCK, a data input/output pin 333 for inputting and outputting data signals: SI (Signal Input) and SO (Signal Output).

The serial storage device 320 is a slave device with a four-port SPI, which includes a chip enable pin 321 for transmitting a chip enable signal CE, a serial clock pin 322 for transmitting a serial clock signal SCK, a serial data output pin 323 for outputting a data signal SO, and a serial data input pin 324 for inputting a data signal SI. As shown in FIG. 7, the chip enable pin 331 of the MCU 330 and the chip enable pin 321 of the serial storage device 320 are electrically connected to each other; the serial clock pins 332 and 322 are electrically connected to each other; and the serial data output pin 323 and the serial data input pin 324 of the serial storage device 320 are both electrically connected to the data input/output pin 333 of the MCU 330.

Figure 8:
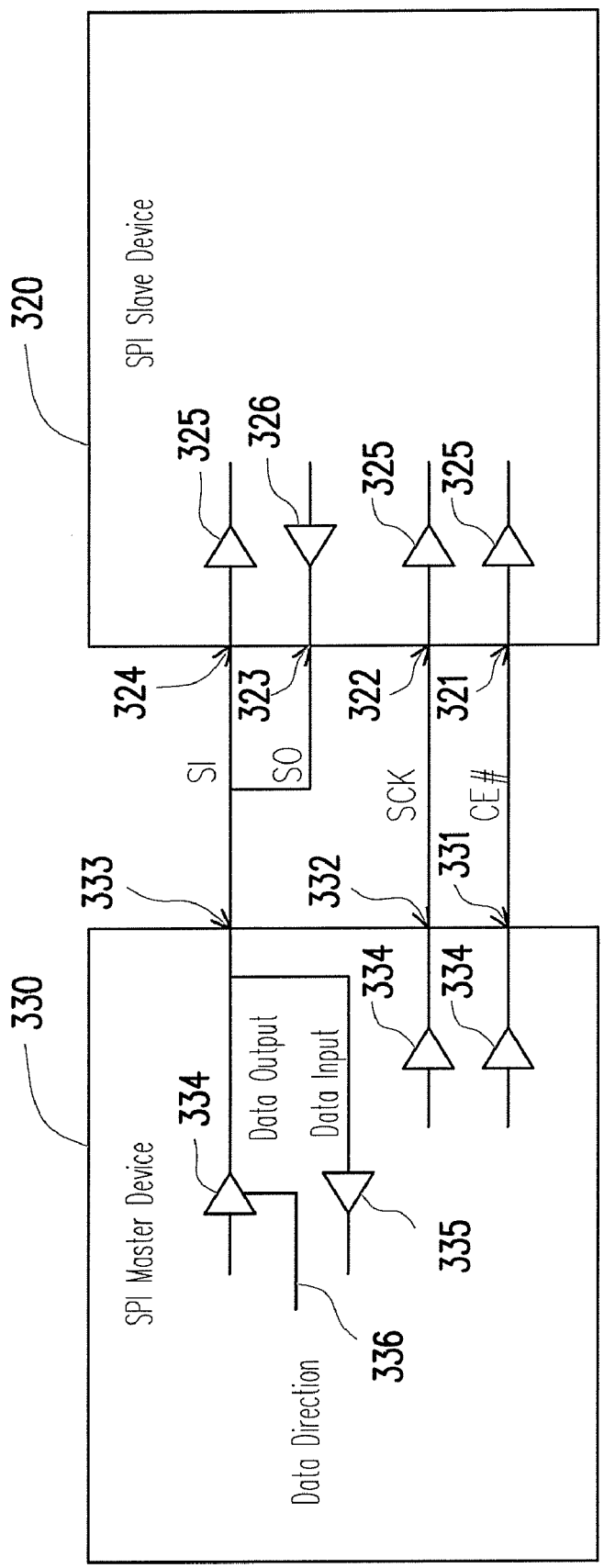
FIG. 8 is a schematic diagram of internal circuit structures of an MCU and a serial storage device in the SPI circuit shown in FIG. 7.

FIG. 8 is a schematic diagram of internal circuit structures of the MCU 330 and the serial storage device 320. Referring to FIG. 8, the serial storage device 320 includes four buffer registers therein, in which three buffer registers 325 have the same transmission direction and the other buffer register 326 has another transmission direction. Signals received by the serial storage device 320 via the chip enable pin 321, the serial clock pin 322 and the serial data input pin 324 are unidirectionally transmitted to the internal circuit thereof respectively through buffer registers, for example, the buffer register 325 connected to the serial data input pin 324. The internal signal of the serial storage device 320 is unidirectionally transmitted to the serial data output pin 323 via the buffer register 326.

The MCU 330 also includes four buffer registers, in which three of them have the same transmission direction (for example, buffer registers 334) and the other buffer register 335 has another transmission direction. Through different buffer registers 334, the MCU 330 can unidirectionally transmit the internal signals thereof to the chip enable pin 331, the serial clock pin 332 and the data input/output pin 333 respectively. The signals received by the data input/output pin 333 of the MCU 330 are unidirectionally transmitted to the internal circuit thereof via the buffer register 335.

Moreover, the buffer register 334 connected to the data input/output pin 333 is controlled by a control signal 336 in terms of the data transmission direction. For example, when the control signal 336 is at a high potential, the buffer register 334 operates normally for data transmission; and when the control signal 336 is at a low potential, the buffer register 334 connected to the data input/output pin 333 stops working and maintains a high impedance state, and at this time, the buffer register 335 is used to receive data.

Figure 9:
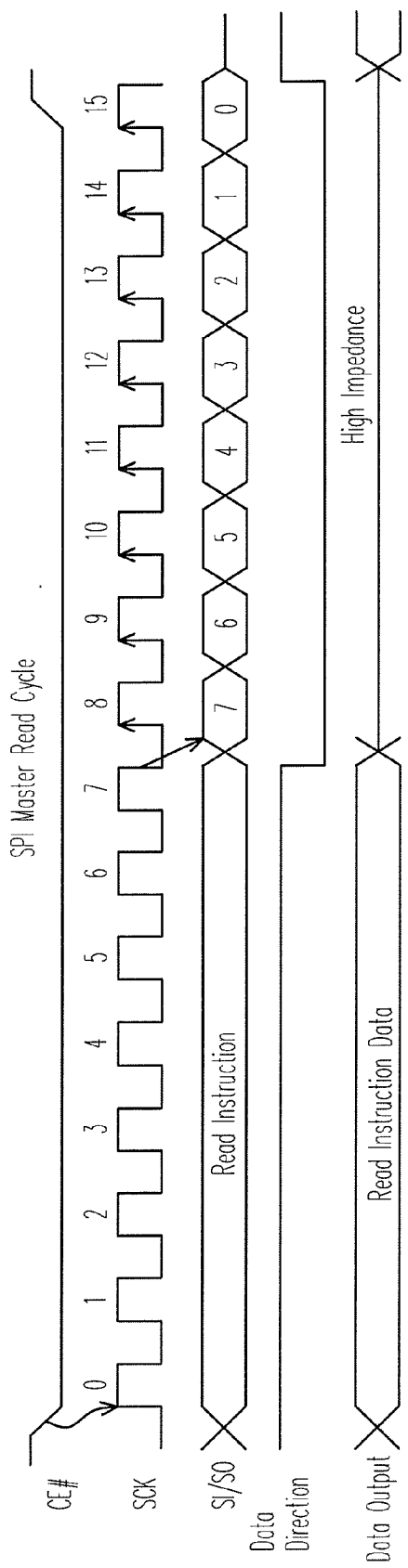
FIG. 9 is a timing control diagram of a data reading motion for the SPI circuit shown in FIG. 7.

FIG. 9 is a timing control diagram of the SPI circuit 300 shown in FIG. 7 in a master read cycle. Referring to FIG. 9, before the data transmission starts, the chip enable signal CE outputted from the chip enable pin 331 of the MCU 330 is at a low potential (the inverted chip enable signal CE# as shown in FIG. 9 is at a high potential) and is transferred to the chip enable pin 321 of the serial storage device 320, so that the serial data output pin 323 of the serial storage device 320 is set in a high impedance state.

When the data transmission starts, the chip enable signal CE of the MCU 330 is converted into a high potential, and the inverted chip enable signal CE# outputted from the chip enable pin 331 is converted into a low potential and transferred to the chip enable pin 321 of the serial storage device 320, for informing the serial storage device 320 to start data transmission. Then, the MCU 330 outputs eight clock 0-7 to the serial clock pin 322 of the serial storage device 320 via the serial clock pin 332. Meanwhile, the control signal 336 is converted into a high potential, so that the buffer register 334 operates normally and outputs a read instruction in the eight clocks. The read instruction is transmitted to the serial data input pin 324 of the serial storage device 320 via the data input/output pin 333 of the MCU 330, so as to inform the serial storage device 320 that the communication this time is a data read cycle.

Upon receiving the eighth clock falling edge, the serial storage device 320 sets the serial data output pin 323 thereof in a normal output status, then outputs data to the data input/output pin 333 of the MCU 330 via the serial data output pin 323 thereof according to the clock SCK. At this time, the control signal 336 is converted into a low potential, so that the buffer register 334 controlled by the control signal 336 stops working and presents a high impedance state. As shown in the figure, the control signal 336 is used to control the data transmission direction (Data Direct). At this time, the data received by the data input/output pin 333 of the MCU 330 is transmitted to the internal circuit of the MCU 330 via the buffer register 335.

Once the data transmission is finished, the chip enable signal CE of the MCU 330 is converted into a low potential, and the inverted chip enable signal CE# outputted from the chip enable pin 331 is converted into a high potential, so that the serial data output pin 323 of the serial storage device 320 is set in a high impedance state, and stops outputting data.

Figure 10:
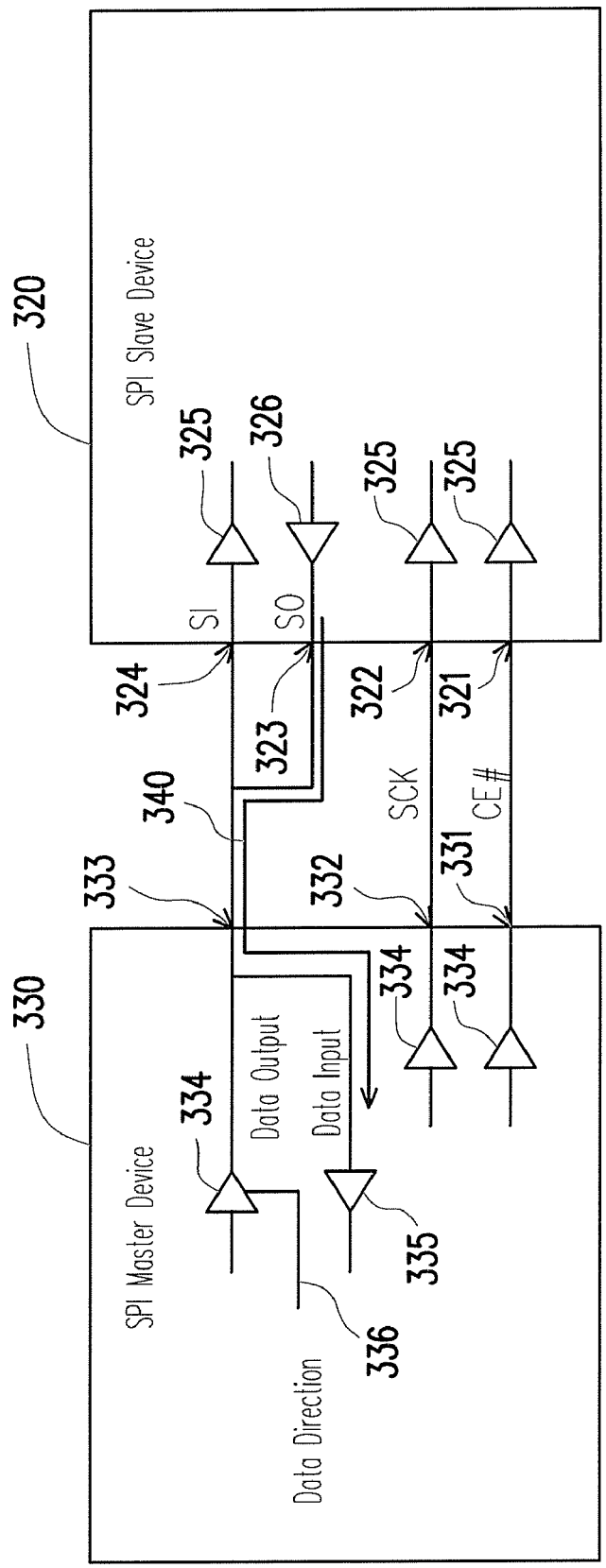
FIG. 10 is a schematic diagram of electrical signal transmission in the SPI circuit shown in FIG. 7 during data writing.

FIG. 10 is a schematic diagram of a data reading direction of the SPI circuit 300 shown in FIG. 7. Referring to FIG. 10, the data read in response to the read instruction of the MCU 330 is outputted from the serial data output pin 323 of the serial storage device 320, then transferred to the data input/output pin 333 of the MCU 330 via a transmission path 340, and then transmitted to the internal circuit of the MCU 330 via the buffer register 335.

Figure 11:
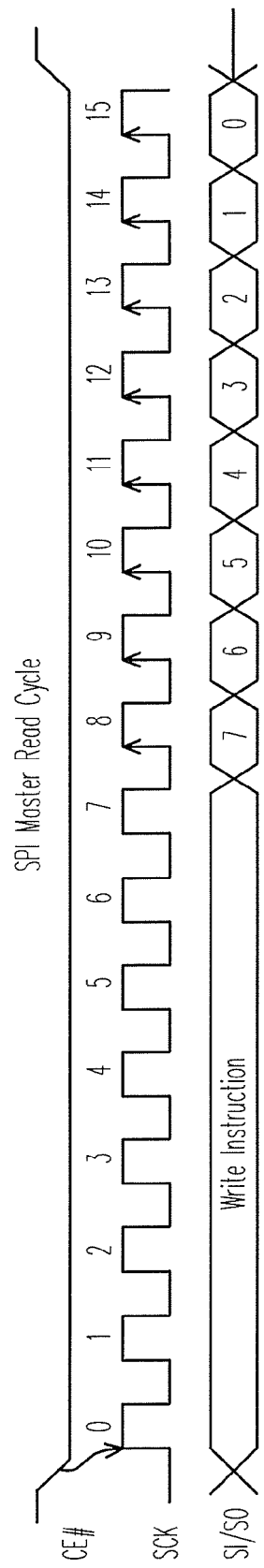
FIG. 11 is a schematic diagram of electrical signal transmission in the SPI circuit shown in FIG. 7 during data reading.

FIG. 11 is a timing control diagram of the SPI circuit 300 shown in FIG. 7 in a master write cycle. Referring to FIG. 11, when the data transmission starts, the chip enable signal CE of the MCU 330 is converted into a high potential, and the inverted chip enable signal CE# outputted from the chip enable pin 331 is converted into a low potential and transferred to the chip enable pin 321 of the serial storage device 320, for informing the serial storage device 320 to start the data transmission.

Then, the MCU 330 outputs eight clocks 0-7 to the serial clock pin 322 of the serial storage device 320 via the serial clock pin 332. Meanwhile, the control signal 336 is converted into a high potential, so that the buffer register 334 operates normally and outputs a write instruction in the eight clocks. The write instruction is transmitted to the serial data input pin 324 of the serial storage device 320 via the data input/output pin 333 of the MCU 330, so as to inform the serial storage device 320 that the communication this time is a data write cycle.

Upon receiving the eighth clock falling edge, the serial storage device 320 sets the serial data input pin 324 thereof in a normal input status, and the control signal 336 still maintains a high potential, so that the buffer register 334 operates normally. Then, according to the clock SCK, the read data is transferred to the internal circuit of the serial storage device 320 for storing therein via the serial data input pin 324.

When transferring an instruction or data to the serial storage device 320 as described above, the buffer registers 335 of the MCU 330 and the buffer register 326 of the serial storage device 320 are both disenabled due to maintaining a high impedance state.

Once the data transmission is finished, the chip enable signal CE of the MCU 330 is converted into a low potential, and the inverted chip enable signal CE# outputted from the chip enable pin 331 is converted into a high potential, so that the serial data input pin 324 of the serial storage device 320 is set in a high impedance state.

Figure 12:
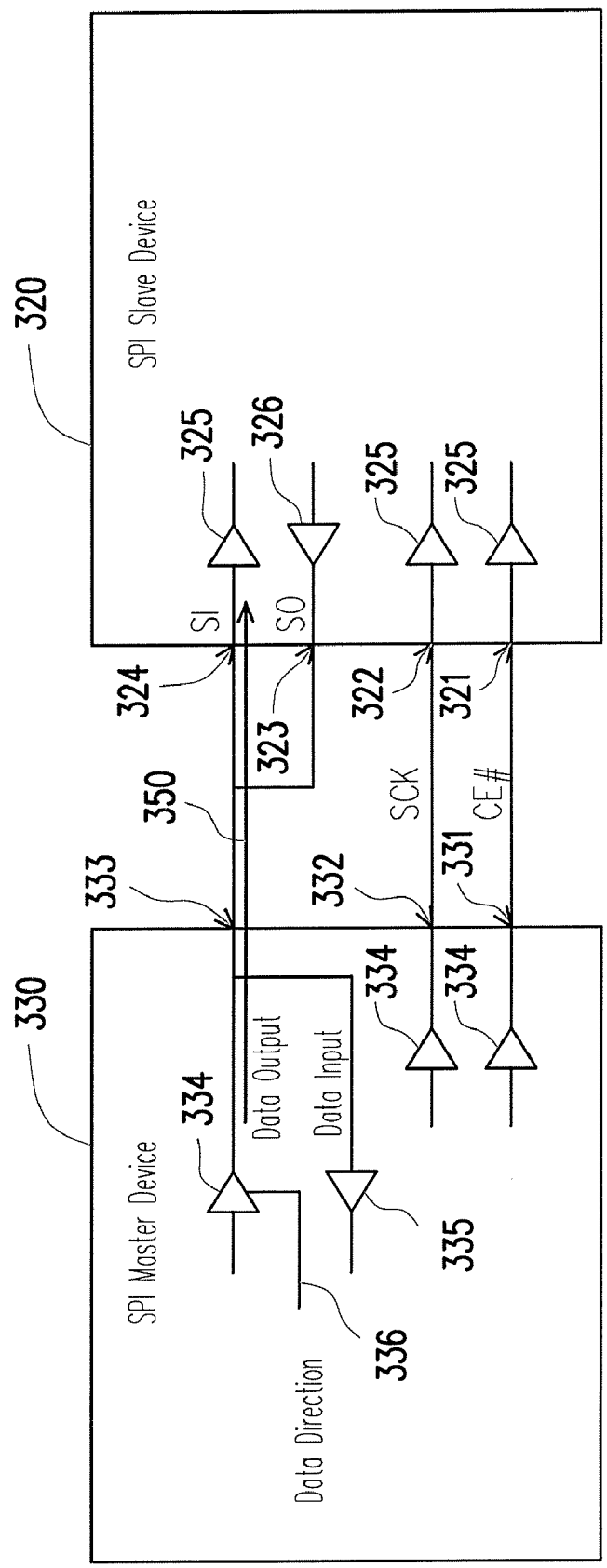
FIG. 12 is a timing control diagram of a data writing motion for the SPI circuit shown in FIG. 7.

FIG. 12 is a schematic diagram of a data writing direction for the SPI circuit 300 shown in FIG. 7. Referring to FIG. 12, the data is transferred to the serial data input pin 324 of the serial storage device 320 from the data input/output pin 333 of the MCU 330 via a transmission path 350, and then transmitted to a position corresponding to the write instruction within the serial storage device 320 for being stored therein.

Figure 13:
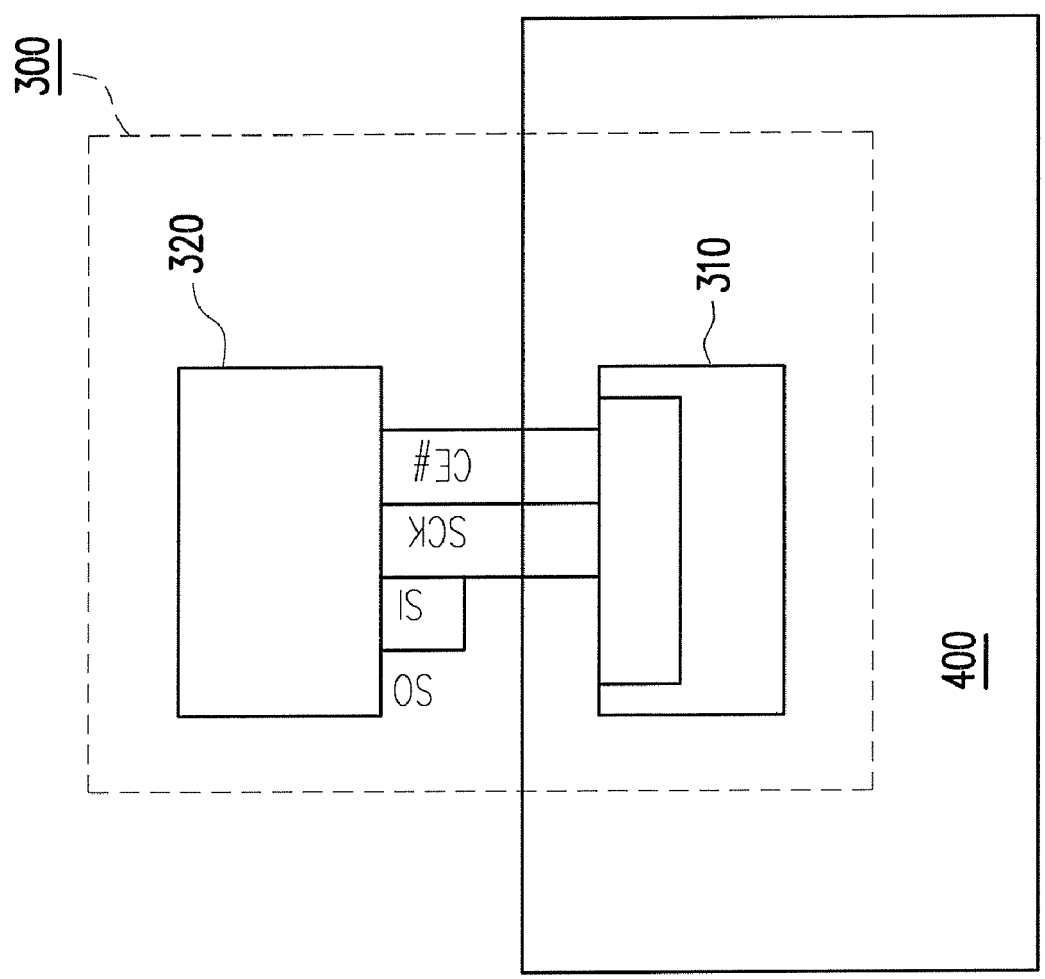
FIG. 13 is a structural schematic diagram of an LCD device according to an embodiment of the present invention.

The above SPI circuit 300 may be combined with an LCD panel, so as to form a liquid crystal display device. As shown in FIG. 13, the SPI circuit 300 is disposed on an LCD panel 400, and is electrically connected to the display panel 400. The LCD panel driving circuit 310 is used to receive image signals inputted from an external circuit, and then generates a gray-scale voltage according to the serial number of the image to drive the LCD panel 400 to display the image. The serial storage device 320 is used to store relevant initialization data of the LCD panel 400.

The SPI circuit provided in the present invention enables an LCD panel driving circuit with a three-port SPI to read a serial storage device with a four-port SPI, and thus the SPI circuit has a better compatibility.

In an alternative embodiment of the present invention, the SPI circuit 300 may also be used in other electronic equipments that adopt the serial storage device, such as cell phones, handheld computers.

It will be apparent to those skilled in the art that various modifications and variations can be made to the structure of the present invention without departing from the scope or spirit of the invention. In view of the foregoing it is intended that the present invention cover modifications and variations of this invention provided they fall within the scope of the following claims and their equivalents.

What is claimed is:

1. A serial peripheral interface (SPI) circuit, comprising:
   a master device, comprising:
   a first chip enable pin;

a first serial clock pin; and
a data input and output common pin; and
a slave device, comprising:
a second chip enable pin, electrically connected to the first chip enable pin of the master device;
a second serial clock pin, electrically connected to the first serial clock pin of the master device;
a serial data input pin, electrically connected to the data input and output common pin of the master device; and
a serial data output pin, electrically connected to the data input and output common pin of the master device,
wherein when a read instruction is transferred from the master device to the slave device, the master device is set in a read status and the slave device outputs data to the master device via the serial data output pin in response to the read instruction, and when a write instruction is transferred from the master device to the slave device, the master device is set in a write status and the master device transfers data to the slave device via the serial data input pin for storing therein in response to the write instruction.

2. The SPI circuit according to claim 1, wherein the slave device is a serial storage device.

3. The SPI circuit according to claim 1, wherein the master device comprises a three-port serial peripheral interface.

4. The SPI circuit according to claim 1, wherein the slave device comprises a four-port serial peripheral interface.

5. The SPI circuit according to claim 1, wherein the first chip enable pin of the master device and the second chip enable pin of the slave device are used to transmit a chip enable signal.

6. The SPI circuit according to claim 1, wherein the first serial clock pin of the master device and the second serial clock pin of the slave device are used to transmit a serial clock signal.

7. The SPI circuit according to claim 1, wherein the slave device comprises a plurality of buffer registers therein, wherein the plurality of buffer registers comprises at least a first buffer register for unidirectionally receiving and registering data transferred via the serial data input pin, and a second buffer register for unidirectionally registering and outputting data to be outputted from the serial data output pin.

8. The SPI circuit according to claim 1, wherein the master device comprises a plurality of buffer registers, wherein the plurality of buffer registers at least comprises a first buffer register and a second buffer register, the first buffer register and the second buffer register are both electrically connected to the data input/output pin.

9. The SPI circuit according to claim 2, wherein the serial storage device is a serial flash memory device.

10. The SPI circuit according to claim 8, wherein when the master device is set in a read status, the first buffer register unidirectionally receives and registers data from the slave device via the data input/output pin, and the second buffer register is in a disabled status.

11. The SPI circuit according to claim 8, wherein when the master device is set in a write status, the second buffer register unidirectionally transfers data to the slave device via the data input/output pin.

12. A display device, comprising:
a display panel;
a driving circuit, coupled to the display panel, for receiving a display data signal and transferring the display data signal to the display panel, wherein the driving circuit comprises:
a first serial peripheral interface, comprising:
a first chip enable pin;
a first serial clock pin; and
a data input and output common pin; and
a serial storage device, comprising:
a second serial peripheral interface, comprising:
a second chip enable pin, electrically connected to the first chip enable pin;
a second serial clock pin, electrically connected to the first serial clock pin;
a serial data input pin, electrically connected to the data input and output common pin; and
a serial data output pin, electrically connected to the data input and output common pin;
wherein when a read instruction is transferred from the driving circuit to the serial storage device, the driving circuit is set in a read status and the serial storage device outputs data to the driving circuit via the serial data output pin in response to the read instruction, and when a write instruction is transferred from the driving circuit to the serial storage device, the driving circuit is set in a write status and the driving circuit transfers data to the serial storage device for storing therein via the serial data input pin in response to the write instruction.

13. The display device according to claim 12, wherein the serial storage device is a serial flash memory device.

14. The display device according to claim 12, wherein the first chip enable pin of the driving circuit and the second chip enable pin of the serial storage device are both used to transmit a chip enable signal.

15. The display device according to claim 12, wherein the first serial clock pin of the driving circuit and the second serial clock pin of the serial storage device are both used to transmit a serial clock signal.

16. The display device according to claim 12, wherein the serial storage device comprises a plurality of buffer registers therein, and the plurality of buffer registers at least comprises a first buffer register for unidirectionally receiving and registering data transferred via the serial data input pin, and a second buffer register for unidirectionally registering and outputting data to be outputted from the serial data output pin.

17. The display device according to claim 12, wherein the driving circuit comprises a plurality of buffer registers and the plurality of buffer registers at least comprises a first buffer register and a second buffer register, the first buffer register and the second buffer register are both electrically connected to the data input/output pin.

18. The display device according to claim 17, wherein when the driving circuit is set in a read status, the first buffer register unidirectionally receives and registers data from the serial storage device via the data input/output pin and the second buffer register is in a disabled status.

19. The display device according to claim 17, wherein when the driving circuit is set in a write status, the second buffer register unidirectionally transfers data to the serial storage device via the data input/output pin.

* * * * *